United States Patent
Hardigg et al.

(10) Patent No.: US 6,332,997 B1
(45) Date of Patent: Dec. 25, 2001

(54) METHOD AND APPARATUS FOR MAKING A ONE PIECE BATTERY JAR

(75) Inventors: James S. Hardigg, Conway; George R. Havrilla, Whately, both of MA (US)

(73) Assignee: Hardigg Industries Inc., South Deerfield, MA (US)

( * ) Notice: Subject to any disclaimer, the term of this patent is extended or adjusted under 35 U.S.C. 154(b) by 0 days.

(21) Appl. No.: 09/084,771

(22) Filed: May 26, 1998

(51) Int. Cl.[7] .......................... B29C 45/22; B29C 45/34; B29C 45/36; B29C 45/42

(52) U.S. Cl. .................... 264/328.1; 264/328.8; 264/334; 264/335; 425/95; 425/96; 425/444; 425/468; 425/577

(58) Field of Search ................ 264/328.1, 328.8, 264/334, 335, 213, 349; 425/468, 577, 556, 95, 96, 444; 294/111

(56) References Cited

U.S. PATENT DOCUMENTS

| | | | |
|---|---|---|---|
| 3,767,156 | * 10/1973 | Sullivan et al. | 249/107 |
| 3,947,208 | * 3/1976 | Broderick | 425/436 R |
| 3,978,186 | * 8/1976 | Lovejoy | 264/329 |
| 4,136,146 | * 1/1979 | Ninneman | 264/237 |
| 4,264,295 | * 4/1981 | Hingley | 425/577 |
| 4,306,851 | * 12/1981 | Thune | 425/468 |
| 4,604,026 | * 8/1986 | Barrett | 414/728 |
| 4,732,558 | * 3/1988 | Grannen, III | 425/570 |
| 4,743,420 | * 5/1988 | Dutt | 264/102 |
| 4,781,571 | * 11/1988 | Heindl et al. | 425/556 |
| 5,080,415 | * 1/1992 | Bjornson | 294/119.1 |
| 5,145,630 | * 9/1992 | Schad | 264/328.8 |
| 5,240,397 | * 8/1993 | Fay et al. | 425/145 |
| 5,257,925 | * 11/1993 | Grimm | 425/556 |
| 5,288,451 | * 2/1994 | Schad | 246/328.8 |
| 5,470,221 | * 11/1995 | Gaiser | 425/556 |
| 5,570,920 | * 11/1996 | Crisman et al. | 249/111 |
| 5,789,033 | * 8/1998 | Bertschi et al. | 425/572 |
| 5,824,256 | * 10/1998 | Ballester | 264/318 |
| 5,849,237 | * 12/1998 | Inoue | 264/319 |

OTHER PUBLICATIONS

Derwent Abstract 198442 for BE–0899829, Oct. 1984.*

* cited by examiner

Primary Examiner—Jan H. Silbaugh
Assistant Examiner—Stefan Staicovici
(74) Attorney, Agent, or Firm—McCormick, Paulding & Huber LLP (57) ABSTRACT

A single piece battery jaw and method and apparatus for producing the same employs a stack molding type machine with material injection from the platens. The apparatus can effectively injection mold a one-piece jar with a straight side wall or an undercut side wall. Zero draft capability is also provided. The apparatus also includes an extraction device and core stabilizers.

17 Claims, 6 Drawing Sheets

METHOD AND APPARATUS FOR MAKING A ONE PIECE BATTERY JAR

BACKGROUND OF THE INVENTION

1. Field of the Invention

The invention relates to the field of industrial battery cases. More particularly, the invention relates to a method and apparatus for making a one-piece battery jar having at least a thicker section at the opening thereof than at other areas of the jar.

2. Prior Art

Lead-acid batteries are used in industry to power vehicles such as fork-lifts. Since a single lead-acid cell has a potential of 2 volts, the higher voltages suitable for motors are attained by packing a number of cells upright, side-by-side, in a steel tray, and connecting them electrically in series.

For the larger batteries, each 2-volt cell is enclosed in its own container which consists of a "jar" whose upper end is initially open to allow insertion of the battery-plate assembly, and a cover, which is welded onto the top of the jar after the battery-plate assembly has been inserted.

To achieve its potential life, the plates of a motive-power lead-acid battery must be pressed tightly against each other to minimize the shedding of plate material. For this reason, the outside of a jar is preferably a rectangular prism. This shape enables the cells to be tightly packed in a rectangular tray made of a material that will maintain the packing pressure during the life of the battery. Typically, the trays are made of steel.

The inside walls of the jar which press against the plates, need to provide the same pressure at the top and the bottom of the plates. This requires the jar to have the same inner dimensions at its top and its bottom. If the jar is molded with "draft" where the top is wider than the bottom, the plates may be pressed tightly together at the bottom, but not tightly packed at the top. The less than optimum pressure between the plates at the top results in relatively more shedding of material and shorter battery life.

Other properties of a battery jar that are necessary to produce a battery of high quality are:

1. Leak-proofness
2. Adequate mechanical strength for the life of the battery-plate assembly at the temperatures occurring in the battery.
3. Provision for good heat welding of the cover to the jar. For this requirement, the following conditions need to be met:
   A. Sufficient wall thickness all around the top of the jar.
   B. Hot-plate welding compatibility between the jar material and the cover material.
   C. The jar and cover materials must not stick to the hot-plate welding platens.

To be acceptable in the market, the above qualities have to be provided at the lowest cost. This requires that a minimum of material be used, that lower cost reprocessed material be used if possible, and that the manufacturing process be relatively low cost.

Battery jars have long been made by injection-molding them in one-piece with some degree of draft from polypropylene co-polymer material. The material is injected at the bottom of the jar and flows toward the open end. Typically, wall thickness is 0.120 inches or greater. This results in a jar which uses a relatively large amount of material. It is difficult to reduce the wall thickness because the plastic material flow-length to passage thickness ratio even at a wall thickness of 0.120" is, for a "high" jar, 29 in/0.120 in=241. This is a high value for injection molding and for polypropylene co-polymer materials having melt-indices low enough so that they do not stick to the hot-plate welding platens. It results in very high injection and mold pressures.

To reduce the amount of material needed to form the jar while retaining the strength thereof, the inventor hereof created a profiled wall battery jar. The jar employs thicker material at the ends of the elongated jar and thinner material at the midsection thereof. This achieves strength yet reduces the amount of material needed. Moreover, and importantly, this provides more space for acid while maintaining strict adherence to the outside dimensions dictated by the conventional mounting areas in machines employing the finished batteries. A more detailed disclosure and explanation of this battery jar having a combination of thick and thin walls is found in U.S. Pat. No. 4,732,826 which is assigned to the assignee hereof and incorporated herein by reference. Conventionally, profiled wall battery jars have been molded in half sections and then welded at the seams. The welding is generally of the hot plate type and is in two steps: first to join the two halves and second, to create a three-layer structure in the joint. The operation is particularly suited to providing a leak-free joint but is relatively labor intensive which, of course, increases cost of manufacture. It has been desired to reduce the labor associated with producing profiled battery jars while retaining the benefits thereof Heretofore it was not known how such benefits could all be achieved.

SUMMARY OF THE INVENTION

The above-discussed and other drawbacks and deficiencies of the prior art are overcome or alleviated by the method and apparatus for making the one-piece battery jar of the invention.

The apparatus for making the one-piece battery jar employs a core having exterior features matching the desired profile for the interior of the jar to be molded (The "profile" may be anything from undercut to straight wall). The core is mounted on a carrier which positions it reliably between two platens having plastic material supply. The platens comprise a stationary platen and a moving platen. The carrier is mechanically linked to the platens in such a way that it is always centered between the platens. The core thus stays centered between the mold cavities. For even more precise centering, the invention preferably employs a number of core stabilizers that retract immediately before the molding material has completely filled the mold. After the material has cooled sufficiently, the platens open and an air puff in the range of about >30–40 psi is employed to temporarily stretch the side-walls of the battery jar. This separates the jar from the core and allows extraction arms with fingers, which move into the mold upon opening, to catch the open end of the jar and extract it from the core. The separation process is useful regardless of whether features are provided on the core or the core is straight. As one of skill in the art will appreciate, stretching of the plastic is necessary to extract the molded part (in a profiled jar situation) because the central area of the core is larger than the ends of the core forming an "undercut" condition. Preferably the fingers extend into very close proximity to the core but do not contact it.

The invention provides one-piece profiled battery jars. Moreover, since no welding is required, a greater percentage (up to 100%) of reclaimed material may be employed. The invention reduces necessary production time for completed jars and reduces costs associated with that production.

BRIEF DESCRIPTION OF THE DRAWINGS

Referring now to the drawings wherein like elements are numbered alike in the several FIGURES.

DETAILED DESCRIPTION OF THE INVENTION

Figure 1:
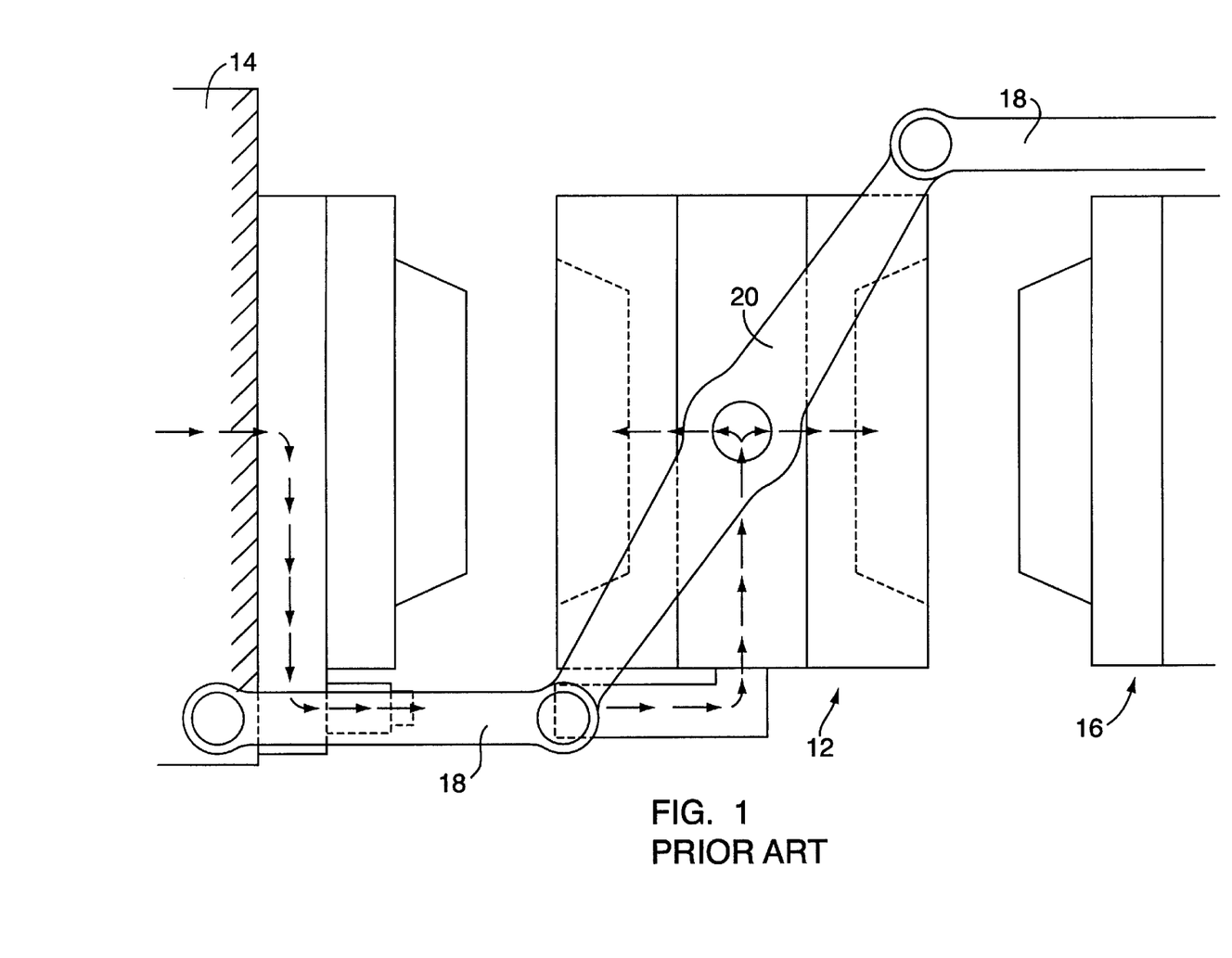
FIG. 1 is a plan view of the centering linkage of a conventional stack-mold arrangement.

Referring to FIG. 1 of the invention, one of ordinary skill will recognize a typical stack molding centering linkage. Such a linkage maintains a portion of the mold assembly 12 in a centered position between a stationary platen 14 and a moving platen 16. The movement is caused by connecting arms 18 and center arm 20 in a known manner.

Figure 2:
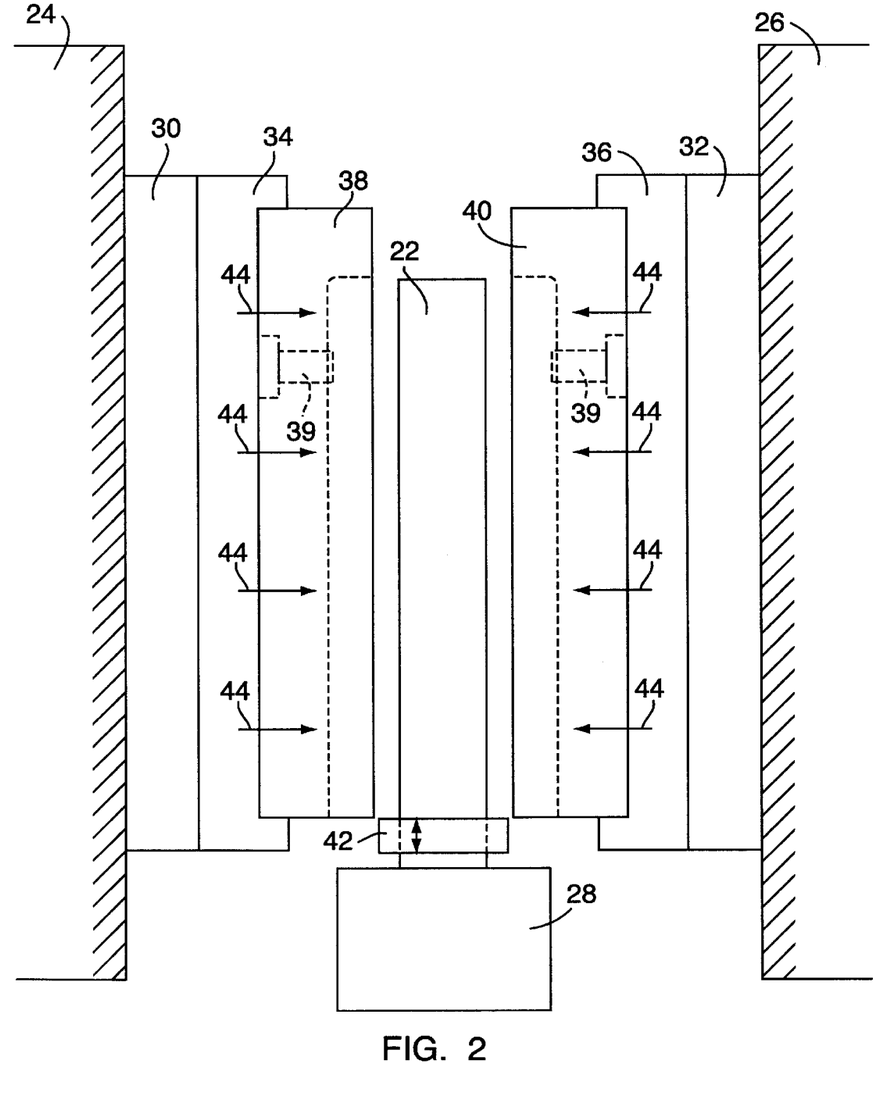
FIG. 2 is an elevation view of the apparatus of the invention.

Referring to FIG. 2, the stack-mold concept of centering a platen has been significantly modified to enable the production of the one-piece battery jar of the invention. More specifically, a core 22 is provided centrally between a stationary platen 24 and a moving platen 26. Core 22 which is a replacement for a center platen, is mounted upon core carrier 28 which in turn is mounted to the equivalent of center arm 20 discussed above. The core may be straight walled and is capable of producing jars with draft angles that include from negative to positive draft. Zero draft is preferred and possible in the invention. Another preferred embodiment employs a core which includes outer features to produce a profiled battery jar wherein a longitudinally central area is of a thinner thickness and at least the longitudinally open end of the jar is of a greater thickness. While not the only difficulty to overcome in creating the invention, one of skill in the molding art will appreciate that removing a part from a core wherein a portion of the part includes a smaller inside dimension than a portion of the core over which it must pass, is not an easy task.

Core 22 is positioned between each platen 24, 26 as noted and each platen preferably includes a spacer 30, 32 attached thereto, a hot manifold 34, 36 (for plastic distribution) and a cavity block 38, 40. Upon closing the mold assembly, a cavity is formed around core 22 which conforms to the outer shape of the part desired. At the bottom of the mold assembly the cavity is sealed prior to injection of material by shut-off ring 42. The cavity is thus sealed and ready for injection of material. Core 22 is preferably positioned vertically and in such a manner as to form a jar with the open end pointing downwardly.

The preferred material for the invention is a polypropylene co-polymer. The material is flowed into the cavity through preferably four injectors 44 on each hot manifold 34, 36. Four injectors 44 are preferred on each side of the mold because of the longitudinal length of the mold cavity. Currently, batteries require molded jars of up to 29 inches in length. By employing more injectors than, for example, one at the end of the mold, more reliable molding is assured and lower tonnages are required. Plastic material is directly suppliable to the hot manifold on the stationary platen and indirectly, i.e. via a sprue bar, to the hot manifold on the moving platen. The material is maintained at molding temperature in the respective hot manifolds and then injected into the cavity created by cavity blocks 38, 40, core 22 and shut-off ring 42.

Figure 2A:
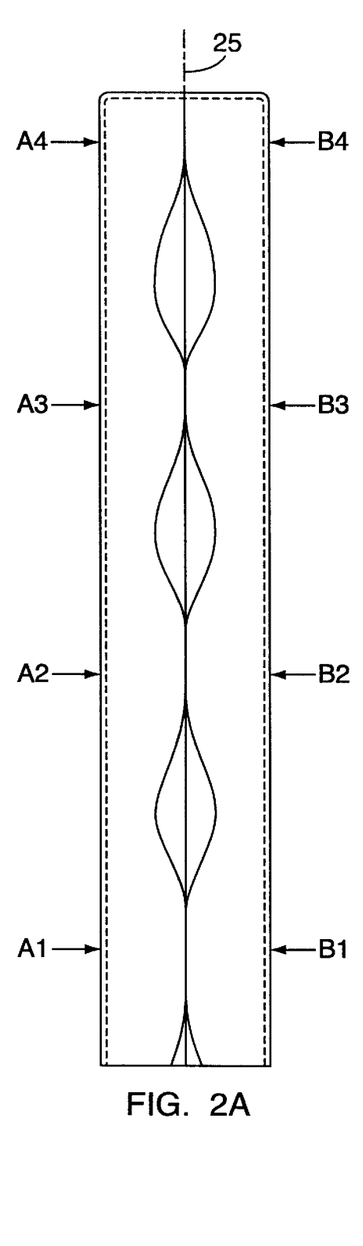
FIG. 2A is a schematic elevation view of the mold cavity filling with material.

With reference to FIG. 2A, the plastic material is injected into the mold at locations $A_1, A_2, A_3$ and $A_4$ on the stationary half of the mold and at locations $B_1, B_2, B_3$ and $B_4$ on the moving half of the mold. As each stream of material flows into the mold, it initially takes the form of an ever-enlarging circular disk. When the $A_2$ and $A_3$ disks, for example, have attained radii equal to one-half of the distance between $A_2$ and $A_3$, the upper edge of the $A_2$ disk and the lower edge of the $A_3$ disk knit together. Then the material in the two disks flows more and more laterally toward the cavity parting-line.

When the plastic material streams, A and B, contact each other in the vicinity of the cavity parting-line, there are pockets of air, as illustrated in FIG. 2A, for which venting must be provided. Venting is provided at the cavity parting-line by a 0.001 in. to 0.002 in. gap between the cavity halves. Since the impingement of the A and B plastic material streams is not always precisely at the cavity parting-line, porous steel inserts approximately 1 in. wide are mounted in each cavity along the parting-line, thereby providing a vented area 2 in. wide.

Figure 2B:
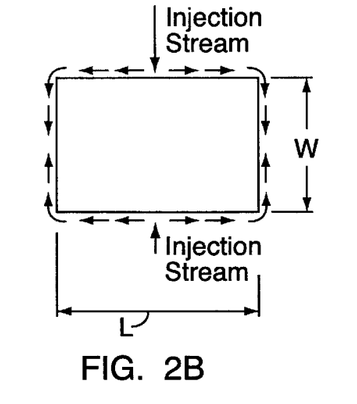
FIG. 2B is a schematic plan of the mold cavity filling with material.
Figure 2C:
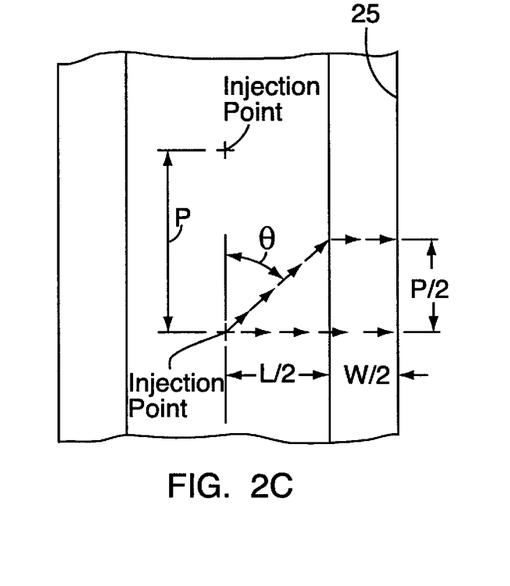
FIG. 2C is a mathematical representation of the flow path experienced during injection.
Figure 2D:
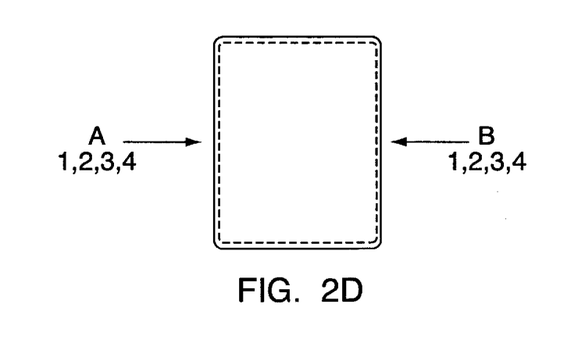
FIG. 2D is a top view of FIG. 2A.

The distance that the plastic material must flow is illustrated in FIG. 2B. A portion of the material moves directly laterally, at 90° to the axis of the core. For this material the flow-path length is:

$$\frac{L}{2} + \frac{W}{2}$$

However, another portion has to move at an angle, θ, to the axis of the core until it reaches the edges of the core; then it moves, at 90° to the core axis, to the parting-line between the cavity halves. This is the longest flow-path required of the material. As shown in FIG. 2B, it is:

$$\frac{(L^2 + P^2)^{1/2} + W}{2}$$

1. For a 25-plate, narrow series jar, L=9.5 inc. and W=6.25 in. Taking P=8.0 in. results in a flow-path length of 9.34 in. Then for a jar wall of 0.060 in. thickness, flow-path length to passage thickness ratio is 9.34/0.060=156. This ratio allows polypropylene co-polymer material to be molded without excessive pressure.

As will be appreciated by one of skill in the art, it is very difficult, if not impossible, to precisely balance the injection of plastic material into a mold cavity. Therefore, there are pressures which are greater on one side of the core than the other. In the case of the present invention this is particularly problematic since the core 22 is mounted to the carrier 28 on only one longitudinal end thereof. The deflection possible over the length of core 22, especially in the case of a 29 inch jar core, can be great enough to actually force core 22 to touch the interior surface of one of the cavity blocks 38, 40. Clearly, this would be dramatically counter productive. In the area where core 22 hits cavity block 38, 40, a hole would develop in the jar. The jar then would be scrap and time will have been lost. Even where core 22 does not touch a wall of the cavity blocks, the jar would still be unacceptably thin.

The present invention includes a plurality of core stabilizers (see FIG. 3) which function to hold core 22 in place during the onset of the injection process and then retract immediately before the injection process halts. In a preferred embodiment the core stabilizers retract within 50 milliseconds, that time frame being preferably within the last 100 milliseconds of the injection process. The core stabilizers, fully retracted, are preferably flush with the wall of the cavity block into which they retract so that the battery jar is smooth on the inner and outer walls thereof. Core 22 is stable after withdrawal of the stabilizers (during the time frame identified) because of the volume of plastic material which has positioned itself around core 22 in the mold cavity.

Figure 3:
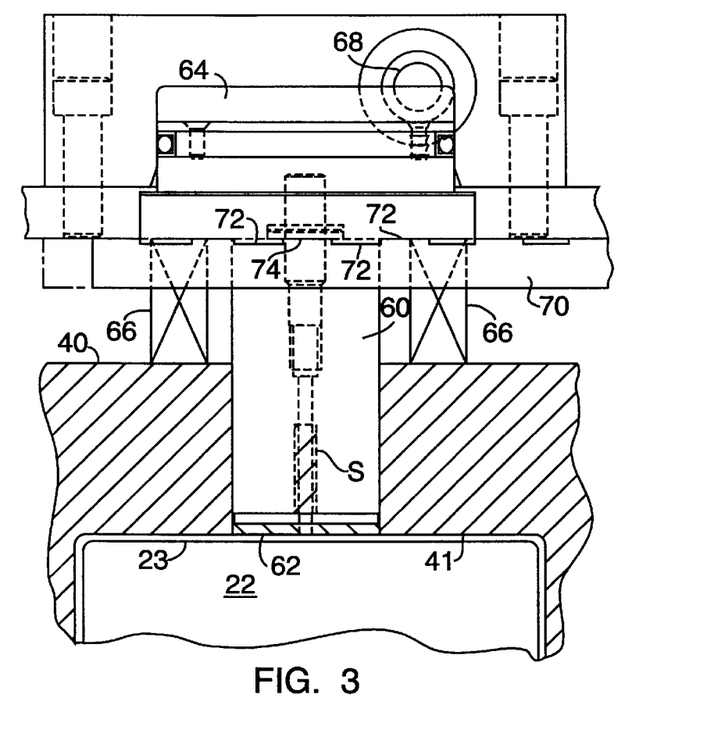
FIG. 3 is a top sectional view of an embodiment of a core stabilizer of the invention.
Figure 4:
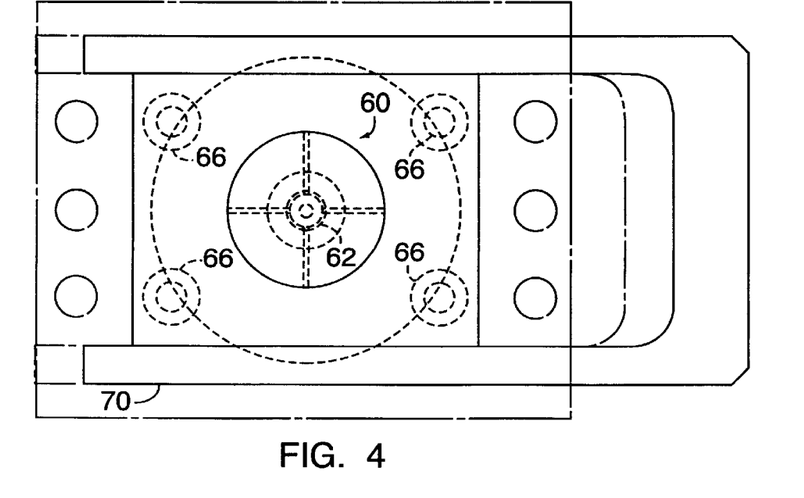
FIG. 4 is an elevational view of the core stabilizer of the invention.

Referring directly to FIGS. 3 and 4, the core stabilizer of the invention is illustrated. Core 22 is illustrated in cross-section from the top. From this description one of skill in the art should appreciate the orientation of the core stabilizers. Each core stabilizer is employed as a pair with an oppositely disposed stabilizer on the other side. In the illustration, a single core stabilizer assembly is shown. It will be understood that the other stabilizers are identical.

Core stabilizer face 62 is illustrated flush with mold cavity block inner face 41. It will be appreciated that face 41 is the exterior surface of the mold cavity, the inner surface of which being provided by core face 23. The face 62 is illustrated in the withdrawn position. More specifically face 62 is flush with inner face 41 so as to make a smooth molded part. This is the position that the stabilizer takes within the last 100 milliseconds of the injection process as above described. One of skill in the art will appreciate the other position of stabilizer 60 to be where face 62 is in contact with surface 23. The stabilizer is in this position during the period of the injection process before the final 100 milliseconds thereof.

Stabilizer 60 is operated by hydraulic fluid pumped into area 64 which urges the assembly and thus the stabilizer 60 toward core 22. The hydraulic fluid pressure overcomes the bias of springs 66 until the release valve 68 dumps pressure in the last 100 milliseconds of the injection process. It should be noted that the various parts of the stabilizer illustrated could be a single machined piece but are broken up for assembly purposes. The manufacturing issues surrounding the individual parts are known to one of skill in the art and do not require explanation. It is important to note only that a system of hydraulic pressuring and a dump valve are employed to actuate the core stabilizer of the invention. It has been found that the hydraulic system is "strong" enough to prevent core deflection where prior art stabilizers have failed to be reliable. The dump valve 68 is preferably a solenoid actuated pilot operated valve with a 65 GPM nominal flow rating.

Another feature of the core stabilizer of the invention is a spacer 70 having castellations thereon. Castellations 72 allow for adjustment of the wall thickness of the part to be molded. As one of skill in the art will appreciate, the wall thickness of the battery jar of the invention may have varying wall thickness as desired by changing the outside dimensions of core 22. Since battery jars of the invention are preferably of either a wall thickness of 0.100 in. or 0.060 in., it was desirable that the stabilizer be adapted to easily accommodate either of these sizes. The castellation bar 70 provides the adjustability quickly and easily.

More specifically, castellation bar 70 is actuatable in a direction perpendicular to the direction of movement of stabilizer 60. The stroke of bar 70 is preferably 0.646 in. in a preferred embodiment but in any event is equivalent to the distance between the center of an upward castellation and the center of a downward castellation such that the stroke of the bar places the bar in a nested position with castellation 74 on stabilizer 60 or in a non-nested position with castellation 74. In a preferred embodiment of this invention, alignment and misalignment of the castellation adjusts the inward movement of stabilizer 60 from 0.060 in. to 0.100 in. Bar 70 is preferably actuated pneumatically.

Upon dumping of hydraulic pressure by valve 68, springs 66 urge stabilizer face 62 into the plane of cavity block inside face 41. With reference to FIG. 4, it will be apparent that a preferred embodiment employs four springs 66.

Figure 5:
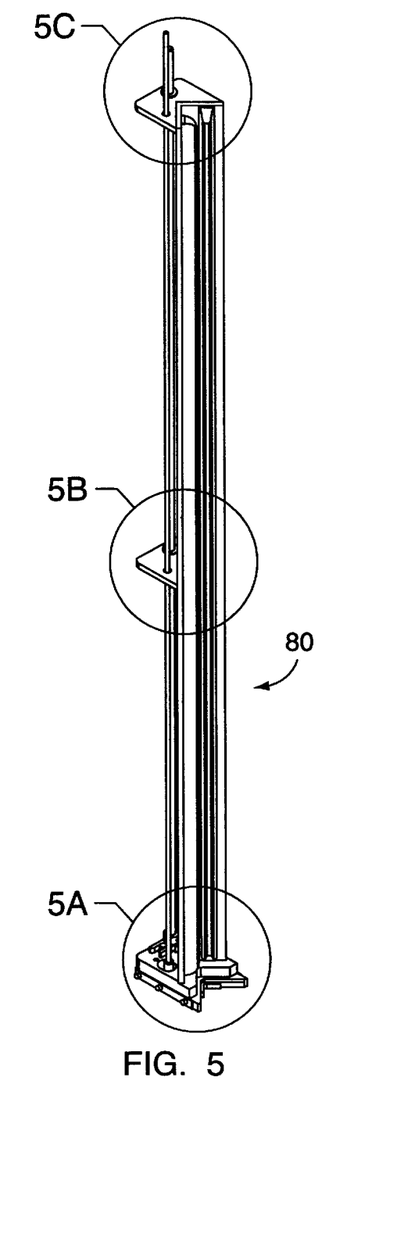
FIG. 5 is a perspective view of an extraction arm of the invention.
Figure 5A:
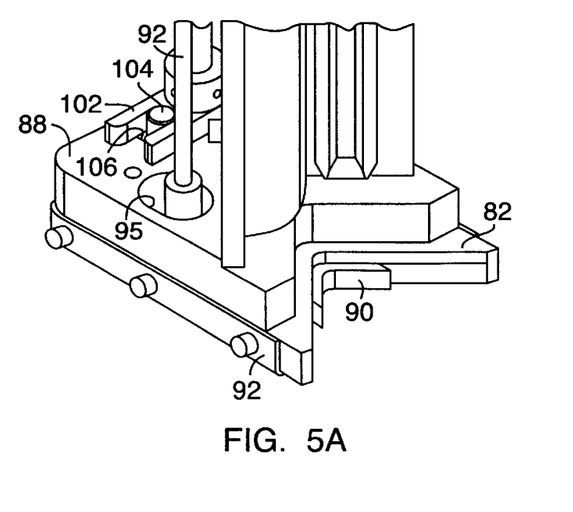
Figure 5B:
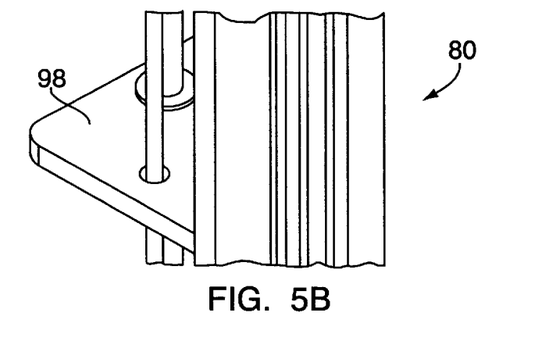
Figure 5C:
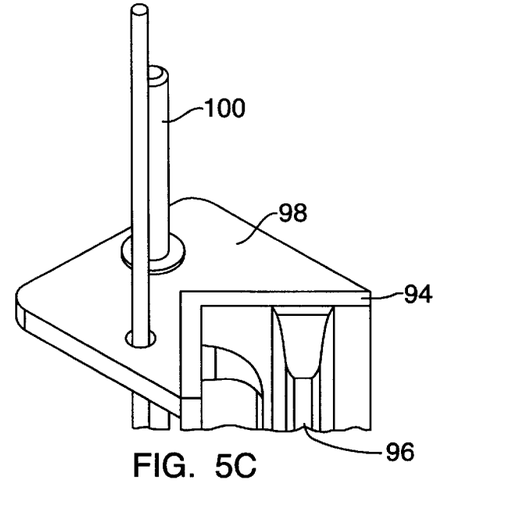
Figure 6:
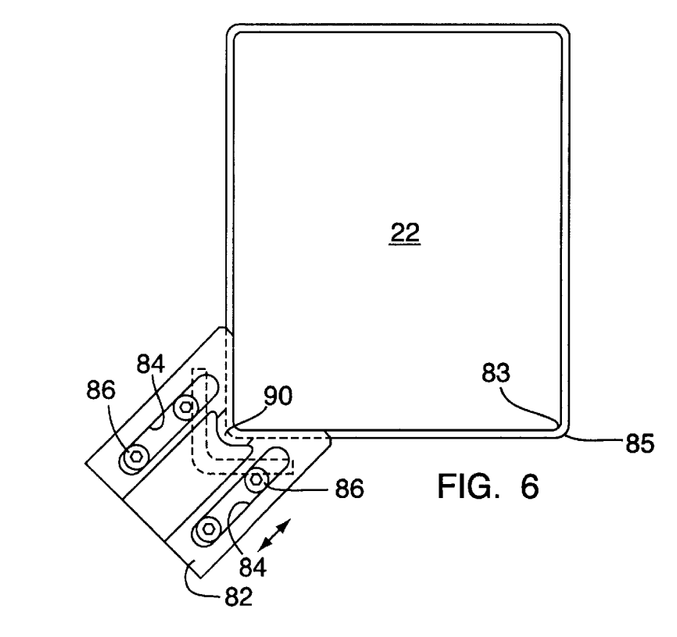
FIG. 6 is a schematic plan view of the core of the invention and the extraction apparatus positioned at one corner thereof.

Referring to FIGS. 5 and 6 another difficulty presented by the desire to injection mold a single piece battery jar having at least a thicker end wall on the open end of the jar, is that removal requires stretching of the thick piece of the jar.

Upon the passage of a short period of time after the plastic material injection process concludes, the material has hardened sufficiently to be removed from the mold. The shorter this period of time can be, the more productive the machine is. It is preferred to allow the material to cool for about 10 seconds prior to opening the mold.

As the mold opens, an extraction assembly (see FIGS. 5 and 6) plunges into the mold area around the core and molded part, preferably near the exterior surface of the part and from the closed end of the jar. The extraction assembly preferably comprises four arms disposed one at each longitudinal edge or corner of the jar. The positioning of the arms at each of the longitudinal corners is important because the friction coefficient resisting removal of the part from the core is concentrated at these corners. Thus, by positioning an extraction force beneath these corners, successful removal of the part from the core is achieved. Each extraction arm 80 includes fingers 82 which are carefully constructed to reach inwardly from the outside surface of the molded jar toward the center thereof to about 90% of the thickness of the wall of the jar. The fingers extend preferably about 1¼ inches in either direction from the corner to increase the surface area contacted. The amount of the molded part contacted is relatively large while the fingers 82 remain a safe distance from core 22 so that scratching of the core will not occur.

Referring directly to FIGS. 5 and 6, one of the extraction arms 80 of the invention is illustrated. FIG. 5 provides a perspective view of arm 80 while FIG. 6 is a plan view of an extraction arm 8 in a relative position with respect to core 22. Clearly FIG. 6 is schematic in that other portions of the mold are not illustrated.

In FIG. 5, finger plate 82 is illustrated at the bottom of extraction arm 80 and is mounted to foot 88 by preferably four screws 86 (shown in FIG. 6). Screws 86 ride in grooves 84 in finger 82. Finger 82 is thus moveable in a single linear direction relative to foot 88.

Focusing on finger 82, preferably constructed of bronze (other materials being acceptable), a "front" portion thereof is profiled to include a substantially right angle such that finger 82 matches the part to be removed.

Dependent from finger 82 is wiper 90. Wiper 90 is preferably constructed of felt although other soft wicking material would also be acceptable. Wiper 90 is mounted to finger 82 by a wiper plate 92 attached to finger 82. Preferably wiper 90 is also spring-loaded onto finger 82 to ensure that as wiper 90 wears it will still contact core 22. This is important since wiper 90 automatically applies a release agent such as silicone to the core 22 as the previously molded part is being extracted.

Wiper 90 is fed by tube 92 from a supply source not shown. For simplicity, tube 92 is moveable with finger 82 and thus requires a slot 95 as shown.

Supporting finger 82, wiper 90 and foot 88 are mounted on frame 94 of preferably a stiff material. Frame 94 also locates and supports limiters 96 which bear against the part to be extracted to prevent finger 82 from touching core 22. Limiters 96 are preferably made of a low-wear material such as ultra high molecular weight polyethylene. Finally, frame 94 provides support structures 98 for tube 92 and for the finger actuating arrangement discussed hereunder. The finger actuating arrangement comprises a shaft 100 which is fixedly connected to a fork 102 adjacent foot 88 and to a rotational driver at the other end thereof (not shown). Any type of driver (e.g. electrical, mechanical, pneumatic, etc) may be employed. The degree of rotation required occurs within 180° and is dictated by the amount of desired displacement of finger 82. Fork 102 engages pin 104 which is fixedly attached to finger 82 and extends upwardly through a slot 106 (the slot being partially obscured from view by fork 102). Upon rotation of shaft 100 and the related movement of fork 102, pin 104 is urged forwardly or backwardly which consequently moves finger 82 toward or away from core 22. Extraction arm 80 is mounted above the mold cavity so as to allow a mechanism to cause a plurality of extraction arms (preferably 4) to plunge into the mold space upon opening and remove the molded part.

Air is preferably injected into the part at each side wall and the closed bottom portion of the part. The injection of air dislodges the part and assists in its removal from the core. Unfortunately, air injection alone does not reduce the extraction force to an acceptable level. Therefore, in a preferred embodiment, the discussed wiper 90 is employed. By applying a release agent with wiper 90, the agent being for example, a silicone fluid, extraction force can be lowered to less than 1000 pounds as opposed to greater than 2000 pounds. It is important to note that the core 22 will have to be coated with the release agent at corners 83 prior to molding the first jar. The automatic recoating will then take place naturally upon the removal of each molded jar.

Due to the air injection there are no shear forces between the center portions of the walls of the jar and the core. The only shear forces to contend with are at the longitudinal edges 85 of the jar. The forces between the jar walls and the core are estimated/calculated below with reference to FIG. 7.

Figure 7:
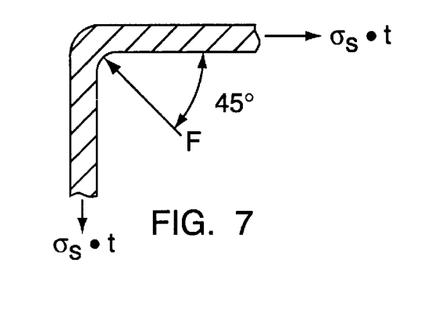
FIG. 7 is an illustration identifying mathematical variables for equations employed herein.

Where:

$\epsilon_s$=strain in material at the time of de-molding in/in

E=Young's Modulus of Elasticity, lb/in$^2$

F=Horizontal force per unit height of a jar–lb/inch $\sigma_s$=stress in material at the time of de-molding, lb/inch$^2$ t=thickness of jar wall, in., for the forces in FIG. 7 to be in equilibrium, $$F = \sqrt{2} \sigma_s \cdot t \quad (1)$$

By Hooke's Law, $\sigma_s = \epsilon_s \cdot E$ (2)

Combining (1) and (2), $$F = \sqrt{2} \cdot \epsilon_s \cdot E \cdot t$$

Based on observation of similar moldings, $\epsilon_s \approx 0.008$ in/in for polypropylene,co-polymer jar material, and $E \approx 150,000$ lb/inch$^2$

|  | then F ≈ √2 · 0.008 · 150,000 · t, lb/inch ≈ 1,696 · t |
|---|---|
| For t = 0.100", | F ≈ 170 lb/inch<br>t = 0.100 |
| For t = 0.060", | F = 102 lb/inch$_2$<br>t = 0.060 |

Each inch of jar in the height-wise direction has four vertical edges; thus the force on it is 4·F.

| For 0.100"<br>jar walls | 4 F ≈ 680 lb/inch<br>t = 0.100" |
|---|---|
| For 0.060"<br>jar walls | 4 F ≈ 408 lb/inch<br>t = 0.060" |

The friction forces resisting extraction per inch of jar height are:

| For 0.100"<br>jar walls | 4 $\mu$ · F ≈ 680$\mu$, lb/inch<br>t = 0.100" | $\mu$ = coefficient of friction |
|---|---|---|
| For 0.60"<br>jar walls | 4$\mu$ F ≈ 408$\mu$, lb/inch<br>t = 0.060" | |

The friction coefficient of polypropylene co-polymer, the preferred material, against (0.060) steel (the likely core material) is approximately 0.20. The extraction force for the thin portion of a jar (for exemplary purposes 26.5 inches in a 29 inch jar) can be calculated as is shown by the equations above. The 26.5 inches of material at the four vertical edges would require (408×0.20)×26.5 to extract the section from the core. This translates to 2,162 pounds of extraction force. This number does not take into account the significantly higher friction created by the thick section of the jar which must stretch over the wider portion of the core to be removed. Thus the actual pounds of extraction force needed would far exceed 2,162 pounds.

Because of the unique construction and operation of the invention, including air injection and the application of release agent as described hereinbefore, the extraction force has been reduced to less than about 1000 pounds. Reducing the friction to the levels disclosed enables faster production and fewer damaged jars.

The method of the invention employs the apparatus of the invention to quickly and efficiently make single piece profiled (or not) battery jars.

Figure 8:
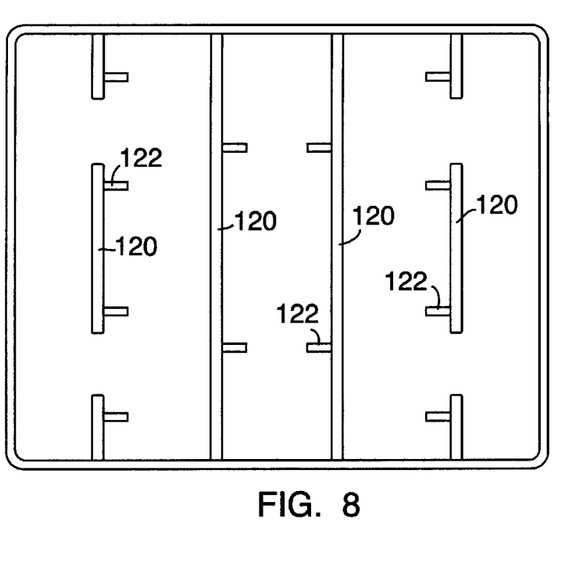
FIG. 8 is a plan view of a bottom of the jar of the invention illustrating bridges.
Figure 9:
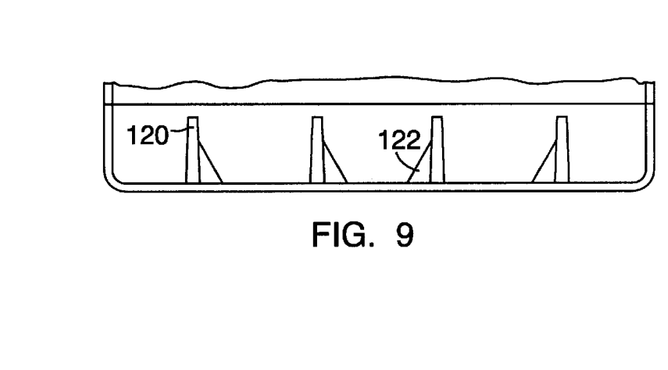
FIG. 9 is an elevational view of the view of FIG. 8.

It should be noted that "rests" or "bridges" for supporting the plates of the battery may be molded into the battery jar of the invention by profiling the core 22 at the closed end. This reduces battery manufacturing time and thereby reduces cost over prior art methods that install bridges after molding is completed. In a preferred embodiment, the bridges molded into the jar of the invention are in the layout of FIGS. 8 and 9. The layout is preferred due to its ability to permit the flow of battery mud i.e., material which is shed principally at the outer edges of the plates, to another chamber thereby avoiding short circuiting caused by mud buildup in a chamber. The bridges include upright members 120 and preferably gussets 122 for added strength. As one of skill in the art will recognize, mud is a limiting factor in the service life a battery. Thus by providing bridges that accommodate more mud before short circuiting the battery, service life is improved.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. In a method for injection molding a hollow molded product in a mold including an elongated central core having a longitudinal axis, a stationary platen and a moving platen, each platen having a mold cavity block associated therewith and matable with each other around said elongated central core, said method comprising mating the mold cavity blocks with each other around said elongated central core to form a mold cavity and injecting a material into said mold cavity to form said hollow molded product, the improvement comprising injecting said material into said mold cavity from both said stationary platen and said moving platen from at least one point from each of said platens in a direction approximately orthogonal to said longitudinal axis.

2. A method for injection molding a hollow molded product in a mold having a central core, a stationary platen and a moving platen, said method comprising:

closing said stationary and moving platen around said central core to form a mold cavity;

injecting a material into said mold cavity to form said hollow molded product;

stabilizing said central core by extending stabilizers from said stationary and said moving platens into contact with said core, said stabilizers including a shaft portion and a face portion wherein said face portion selectively contacts said central core and has a larger cross-sectional area than said shaft portion.

3. A method for injection molding a hollow molded product in a mold having a central core, a stationary platen and a moving platen as claimed in claim 2 wherein said stabilizing includes pressurizing a cavity with which a stabilizer is in contact to urge said stabilizer into contact with said core.

4. A method for injection molding a hollow molded product in a mold having a central core, a stationary platen and a moving platen as claimed in claim 3 wherein said stabilizing further includes releasing said stabilizer from said contact with said core, said releasing to occur within a time frame defined by the last 100 milliseconds of said injecting.

5. A method for injection molding a hollow molded product in a mold having a central core, a stationary platen and a moving platen as claimed in claim 2 wherein said closing of said stationary and moving platens around said central core is achieved by providing a centralizer to centralize said core while said closing occurs.

6. A method for injection molding a hollow molded product in a mold having a central core, a stationary platen and a moving platen as claimed in claim 5 wherein said closing further includes releasably sealing a bottom of the cavity defined by said stationary and moving platens around said core.

7. A method for injection molding a hollow molded product in a mold having a central core, a stationary platen and a moving platen as claimed in claim 2 wherein said injecting is defined by injecting the molding material from both said stationary platen and said moving platen.

8. A method for injection molding a hollow molded product in a mold having a central core, a stationary platen and a moving platen as claimed in claim 7 wherein said injecting includes venting of air in the cavity defined by said moving and stationary platens around said core.

9. A method for injection molding a hollow molded product in a mold having a central core, a stationary platen and a moving platen as claimed in claim 2 wherein said extracting includes:

providing a plurality of extracting arms;

plunging said arms into the mold;

engaging said product with said arms; and removing said product from the core.

10. A method for injection molding a hollow molded product in a mold having a central core, a stationary platen and a moving platen as claimed in claim 9 wherein said engaging is by moving a finger of said extraction arm toward said core to position said finger under said product whereby retracting of said extraction arms draws said product off said core.

11. A method for injection molding a hollow molded product in a mold having a central core, a stationary platen and a moving platen as claimed in claim 9 wherein said removing includes puffing a gas into said product through said core.

12. A method for injection molding a hollow molded product in a mold having a central core, a stationary platen and a moving platen as claimed in claim 11 wherein said puffing occurs at a plurality of points and causes pressure to build rapidly within the product to about 30 to about 40 p.s.i.

13. A method for injection molding a hollow molded product in a mold having a central core, a stationary platen and a moving platen as claimed in claim 10 wherein said moving of said finger includes activating a yoke in a shaft and urging said finger toward said core.

14. A method for injection molding a hollow molded product in a mold having a central core, a stationary platen and a moving platen as claimed in claim 2 wherein said extracting further includes applying a release agent to said core concurrently with removing said product from said core.

15. A method for making a single-piece battery jar comprising:

clamping a core between a plurality of cavity blocks, whereby a space is defined between said core and said cavity blocks;

injecting a material into said space;

opening said cavity blocks; and removing a jar created from said material by reaching a plurality of arms between said cavity blocks and engaging corner portions of said jar, injecting air into said jar and urging said jar off said core.

16. A method for making a single-piece battery jar as claimed in claim 15 wherein said space is of a single dimension in the longitudinal direction to produce a straight walled battery jar.

17. A method for making a single-piece battery jar as claimed in claim 15 wherein said space is of a plurality of dimensions in the longitudinal direction to produce a profiled wall battery jar.

\* \* \* \* \*